G. F. KUEHN AND L. W. ROSENTHAL.
JACK.
APPLICATION FILED AUG. 26, 1920.
1,420,113.  Patented June 20, 1922.
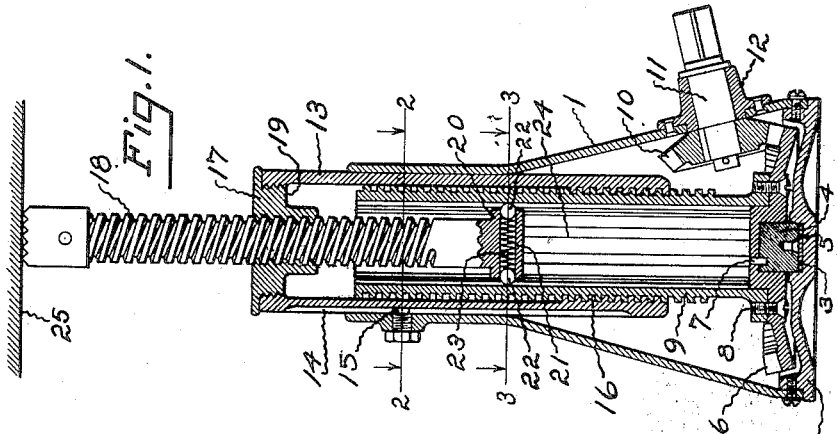
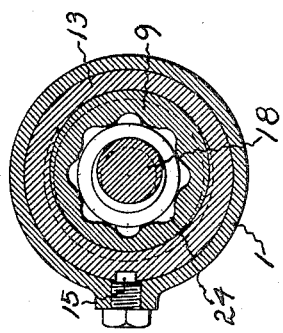
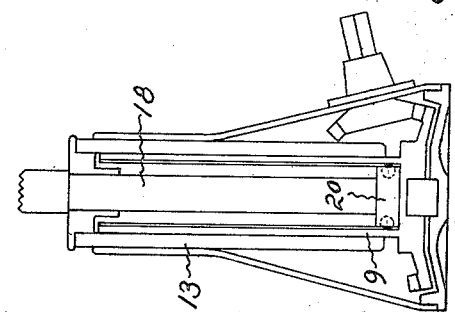
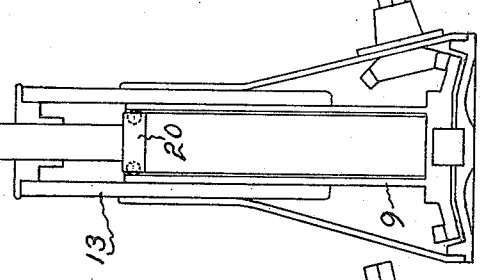
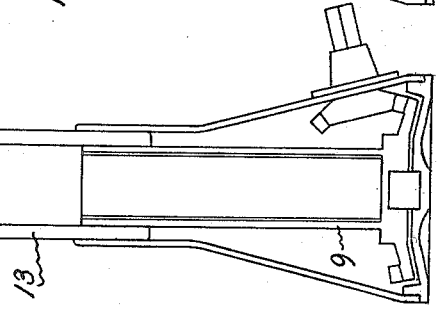
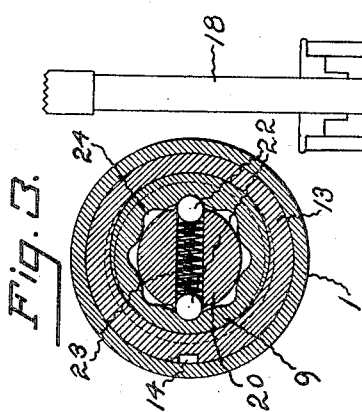
INVENTORS
George F. Kuehn
& Leon W. Rosenthal
BY
ATTORNEYS

UNITED STATES PATENT OFFICE.

GEORGE F. KUEHN, OF SPRINGFIELD, AND LEON W. ROSENTHAL, OF LONGMEADOW, MASSACHUSETTS; SAID KUEHN ASSIGNOR TO SAID ROSENTHAL.

JACK.

1,420,113.      Specification of Letters Patent.      Patented June 20, 1922.

Application filed August 26, 1920. Serial No. 406,124.

*To all whom it may concern:*

Be it known that we, GEORGE F. KUEHN and LEON W. ROSENTHAL, citizens of the United States, residing at Springfield, in the county of Hampden and State of Massachusetts, and at Longmeadow, in the county of Hampden, and State of Massachusetts, respectively, have invented certain new and useful Improvements in Jacks; and we do hereby declare the following to be a full, clear, and exact description of the invention, such as will enable others skilled in the art to which it appertains to make and use the same.

The present invention relates to jacks, and particularly to a jack which is especially adapted for automobiles or the like.

Jacks have heretofore been devised for increased speed in their movements of extension or retraction during engagement with the load. In such devices it has been usual to employ telescoping screws, one being constrained from rotating, and the other being free to rotate and connected to driving means. In this form either the load-engaging member moves to and from the load comparatively slowly and by reason of its higher speed upon engagement with the load abnormally increased turning effort is required, or, in order to reduce the turning effort during engagement, the speed of the load-engaging member during disengagement is abnormally low.

In the present invention the extensive or retractive movements of the jack, while disengaged from the load, exceed in speed those during engagement with the load, thus overcoming the foregoing difficulties. This result is attained by two cooperative members longitudinally movable relatively to each other and a load-engaging member carried by one of the cooperative members and having a yielding driving connection which is constructed and arranged to produce longitudinal movement relatively to the cooperative member when it is disengaged from the load, and fixity therewith when engaged with the load. The load-engaging member may be carried by one of the cooperative members and have either a yielding driving connection with the other of the cooperative members or a yielding connection with an actuating member.

Preferably the cooperative members consist of two relatively-rotatable cooperative screws, the load-engaging member being a screw rotatable relatively to the cooperative screw which carries it. One of the cooperative screws may be an actuating screw and the other a screw telescoping therewith, preferably a sleeve in screw-threaded engagement with the actuating screw. The load-engaging screw, which is preferably oppositely threaded to produce the relative speeds above noted, may be carried by the telescoping screw or sleeve and have with the actuating screw a yielding driving connection which is constructed and arranged to constrain relative rotation between the actuating and load-engaging screw to thereby cause relative rotation between the telescoping screw or sleeve and the load-engaging screw when the latter is disengaged from the load, and which operates upon engagement with the load to permit relative rotation between the load-engaging and actuating screws.

In the specific embodiment of the invention described hereinafter, the yielding driving connection between the actuating and load-engaging screws causes the load-engaging screw to rotate with the actuating screw and to travel axially thereof in movements proportional to the sum of the pitches of the threads on said screw, when the load-engaging screw is disengaged from the load, and, when the load-engaging screw is engaged with the load, operates to cause the actuating screw to rotate independently of the load-engaging screw and to reduce the axial travel of the latter to that of the sleeve.

Whether or not the relatively-rotatable cooperative screws consist of an actuating screw and a telescoping screw or sleeve in screw threaded engagement with the actuating screw, but preferably in combination with either, the invention comprehends as another of its parts yielding driving means for the jack, preferably consisting of spring pressed members, constructed and arranged to produce relative rotation between the load-engaging screw and the screw with which it is meshed when the load-engaging screw is disengaged from the load and to produce fixity therewith when the load-engaging screw is engaged with the load. Where the cooperative screws consist of an actuating screw and a sleeve, the actuating screw may have a plurality of longitudinal grooves on its inner wall and the load-engaging screw, carried by the sleeve, may have spring pressed members cooperating with the grooves. In the specific embodiment of the invention described hereinafter, the yielding driving means comprises a spring pressed ball clutch carried by the load-engaging screw and cooperating with the longitudinal grooves on the inner wall of the sleeve.

Irrespective of the form of driving means, the invention further comprehends as another of its parts, a jack comprising two relatively-rotatable cooperative screws and a load-engaging screw carried by one of said screws and yieldably connected with the other. The two cooperative screws may take the form of an actuating screw and a cooperative screw, preferably a sleeve meshed with the actuating screw, the load-engaging screw being carried by the cooperative screw or sleeve and yieldably connected to the actuating screw. The sleeve preferably has a less number of threads than the actuating screw to reduce its internal threading as far as is consistent with suitable threaded engagement at all positions thereof. Where the jack has a casing, the sleeve is splined and a detent is fastened in the casing fitting the spline to constrain the rotation of the sleeve and to limit its axial travel relatively to the actuating screw. In the specific embodiment of the invention described hereinafter, the spline terminates near the ends of the sleeve and a pin is fastened in the casing and fits in the spline to constrain rotation of the sleeve and to limit the axial travel of the latter relatively to the actuating screw.

The invention further comprehends as another of its parts a jack having an actuating screw, a sleeve in screw-threaded engagement therewith, a head threaded on the sleeve and a load-engaging screw threaded in the head. Preferably the sleeve has an annular recess therein into which the actuating screw extends when the sleeve is in its lowermost position to reduce the length of the jack when collapsed.

In the accompanying drawings illustrating the preferred embodiment of the invention in application, as an example, to a jack for a movable vehicle, Fig. 1 is a central vertical section of the jack; Fig. 2 is a section on line 2—2 of Fig. 1; Fig. 3 is a section on line 3—3 of Fig. 1; Fig. 4 is a diagrammatic view in elevation of the jack showing the parts collapsed; Fig. 5 is a similar view showing the jack partly extended; and Fig. 6 is a similar view showing the jack fully extended.

The mechanism is supported within a drawn metal or cast casing 1 screwed to a base plate 2 which has a central socket for receiving a bearing plate 3 and a stud 4, the latter having a central bore providing an annular bearing surface at 5. The gear 6 is pinned at 7 to the stud and is screwed at 8 to the hollow actuating screw 9 which is exteriorly threaded throughout its length. Meshing with the gear 6 is a pinion 10 keyed to a shaft 11 which is journaled in a bearing 12 riveted to a flattened portion of casing 1. The end of shaft 11 may be connected to a power shaft or equipped with a manually operated handle (not shown).

Cooperating with the actuating screw 9 is a telescoping screw or sleeve 13 which has a longitudinal spline 14 terminating near the ends thereof. Fitting the spline is a pin 15, fastened in the casing, for constraining the rotation of the sleeve and limiting its upward movement. The inner wall of the sleeve has, in its lower portion only, threads 16 less in number than the threads on the actuating screw 9 but extending upwardly a sufficient distance to provide a suitable threaded engagement at all positions of the sleeve. Threaded in the upper end of the sleeve 13 is a head 17 which carries in screw-threaded engagement therewith a load-engaging screw 18 having a double thread cut oppositely in direction to the actuating screw threads and of greater pitch, and the head 17 is provided with an annular recess at 19 into which the actuating screw extends when the sleeve is in its lowermost position.

The lower end of the load-engaging screw 18 terminates in a disc-shaped head 20 having a transverse opening 21 in which is mounted a ball clutch comprising balls 22 pressed outwardly by a spring 23. The edges of the transverse opening are turned over or otherwise formed to retain the balls 22 within the opening while permitting their yielding engagement with a diagonally opposite pair of a plurality of longitudinal grooves 24 formed in the interior wall of actuating screw 9.

The jack is driven by the shaft 11 which operates through the pinion and gear to turn the actuating screw 9, and the sleeve 13, constrained from rotation by the pin 15, is extended or retracted by the actuating screw carrying with it the load-engaging screw 18. As long as the head 20 is within the actuating screw 9, during disengagement from the load, the load-engaging screw 18 is constrained to rotate with the actuating screw by the ball clutch, the spring 23 of which is of sufficient strength to hold the balls 22 in engagement with the grooves 24. The load-engaging screw therefore travels axially relatively to the actuating screw in movements proportional to the sum of the pitches of the threads on the sleeve and the load-engaging screw. When, however, the load-engaging screw engages the load, indicated at 25, and while the head 20 is within the actuating screw, the pressure of the spring 23 is overcome and the clutch yields to permit the actuating screw to rotate independently of the load-engaging screw in which circumstance, as well as when the head travels beyond the upper end of the actuating screw, the load-engaging screw becomes fixed relatively to the sleeve 13 and its axial travel is therefore reduced to that of the sleeve. Consequently it will appear that the load-engaging screw 18 can speedily be brought into engagement with the load and the jack quickly rendered operative, and that after engagement with the load, or disengagement of the head 20 from the interior of the actuating screw, under which conditions the movement of the load-engaging screw is reduced to that of the sleeve, the effort required to lift the load is correspondingly minimized. Furthermore, the effective range of operation of the jack is increased and its length when collapsed reduced by the recess 19 in the head 17 for receiving the end of the actuating screw 9.

Fig. 4 diagrammatically illustrates the jack with its parts collapsed to their lowermost position, the head 20 of the load-engaging screw 18 occupying a position at the lower end of the actuating screw 9. In Fig. 5 the jack is shown partly extended with the head 20 at the extreme upper end of the actuating screw, the limiting position of the head beyond which, as in Fig. 6, the clutch disengages and the load-engaging screw 18 becomes fixed with the sleeve 13, its axial travel then being reduced to that of the sleeve whether or not the load is engaged.

Having thus described our invention, what we claim is:

1. In a jack, two cooperative members longitudinally movable relatively to each other, and a load-engaging member carried by one of the cooperative members and having a yielding driving connection constructed and arranged to produce longitudinal movement relatively thereto when it is disengaged from the load and fixity therewith when it is engaged with the load.

2. In a jack, two cooperative members longitudinally movable relatively to each other, and a load-engaging member carried by one of the cooperative members and having with the other of the cooperative members a yielding driving connection constructed and arranged to produce relative longitudinal movement between the load-engaging member and the cooperative member by which it is carried when said load-engaging member is disengaged from the load and fixity therewith when engaged with the load.

3. In a jack, an actuating member, a cooperative member, and a load-engaging member carried by the cooperative member and having with the actuating member a yielding connection constructed and arranged to produce relative longitudinal movement between the cooperative member and the load-engaging member when the latter is disengaged from the load and fixity therewith when engaged with the load.

4. In a jack, two relatively-rotatable cooperative screws, and a load-engaging screw carried by one of the cooperative screws and having a yielding driving connection constructed and arranged to produce rotation relatively thereto when disengaged from the load and fixity therewith when engaged with the load.

5. In a jack, two relatively-rotatable cooperative screws, and a load-engaging screw carried by one of the cooperative screws and having with the other cooperative screw a yielding driving connection constructed and arranged to produce relative rotation between the cooperative carrying screw and the load-engaging screw when the latter is disengaged from the load and fixity therewith when engaged with the load.

6. In a jack, an actuating screw, a screw telescoping therewith, and a load-engaging screw carried by the telescoping screw and having with the actuating screw a yielding driving connection constructed and arranged to produce relative rotation between the telescoping and load-engaging screws when the latter is disengaged from the load and fixity therewith when engaged with the load.

7. In a jack, an actuating screw, a screw telescoping therewith, and a load-engaging screw carried by the telescoping screw and having with the actuating screw a yielding connection constructed and arranged to constrain relative rotation between said actuating and load-engaging screws to thereby cause relative rotation between said telescoping and load-engaging screws when the latter is disengaged from the load and which operates upon engagement with the load to permit relative rotation between said load-engaging and actuating screws.

8. In a jack, an actuating screw, a sleeve in screw-threaded engagement with said actuating screw, and a load-engaging screw carried by the threaded sleeve and having with the actuating screw a yielding connection constructed and arranged to constrain relative rotation between said load-engaging and actuating screws to thereby cause relative rotation between said sleeve and the load-engaging screw when the latter is disengaged from the load, and which operates upon engagement with the load to permit relative rotation between said load-engaging and actuating screws.

9. In a jack, an actuating screw, a sleeve in screw-threaded engagement with said actuating screw, and an oppositely threaded load-engaging screw carried by the sleeve and having with the actuating screw a yielding connection constructed and arranged to constrain relative rotation between said load-engaging and actuating screws to thereby cause relative rotation between said sleeve and the load-engaging screw when the latter is disengaged from the load, and which operates upon engagement with the load to permit relative rotation between said load-engaging and actuating screws.

10. In a jack, an actuating screw, a sleeve in screw-threaded engagement with said actuating screw, and an oppositely threaded load-engaging screw carried by the sleeve and having with the actuating screw a yielding connection which, when said load-engaging screw is disengaged from the load, causes said load-engaging screw to rotate with said actuating screw and to travel axially thereof in movements proportional to the sum of the pitches on the threads of each of said screws, and which, when said load-engaging screw is in engagement with the load, operates to cause said actuating screw to rotate independently of said load-engaging screw and to reduce the axial travel of the latter to that of the sleeve.

11. In a jack, two relatively-rotatable cooperative screws, a load-engaging screw meshed with one of said screws, and yielding driving means constructed and arranged to produce relative rotation between the load engaging screw and the screw with which it is meshed when the load-engaging screw is disengaged from the load and to produce fixity therewith when the load-engaging screw is engaged with the load.

12. In a jack, two relatively-rotatable cooperative screws, a load-engaging screw meshed with one of said screws, and driving means which includes spring-pressed members carried by said load-engaging screw and which is constructed and arranged to produce relative rotation between the latter and the screw with which it is meshed when the load-engaging screw is disengaged from the load and to produce fixity therewith when the load-engaging screw is engaged with the load.

13. In a jack, an actuating screw having a plurality of longitudinal grooves on its inner wall, a sleeve in screw-threaded engagement with said actuating screw, a load-engaging screw carried by said sleeve and having spring-pressed members cooperating with said grooves to produce relative longitudinal movement between said sleeve and said load-engaging member when the latter is disengaged from the load, and fixity between said sleeve and load-engaging member when the latter is engaged with the load.

14. In a jack, an actuating screw, a screw telescoping therewith, a load-engaging screw meshed with said telescoping screw, and driving means which includes a spring-pressed ball clutch carried by said load-engaging screw and which is constructed and arranged to produce relative rotation between the latter and the telescoping screw when the load-engaging screw is disengaged from the load and to produce fixity between them when the load-engaging screw is engaged with the load.

15. In a jack, an actuating screw, a sleeve in screw-threaded engagement with said actuating screw having longitudinal grooves on its inner wall, a load-engaging screw meshed with said sleeve, and driving means, including a spring-pressed ball clutch carried by said load-engaging screw and cooperating with said longitudinal grooves, to constrain relative rotation between said actuating and load-engaging screws when the load-engaging screw is disengaged from the load, and which is yieldable upon engagement with the load to permit the actuating screw to rotate independently of the load-engaging screw.

16. In a jack, two relatively-rotatable cooperative screws, and a load-engaging screw carried by one of said screws and yieldably connected to the other of said screws.

17. In a jack, an actuating screw, a cooperative screw meshed therewith, and a load-engaging screw carried by said cooperative screw and yieldably connected to the actuating screw.

18. In a jack, an actuating screw, a sleeve in screw-threaded engagement with said actuating screw, and a load-engaging screw carried by said sleeve and yieldably connected to said actuating screw.

19. In a jack, an actuating screw, a sleeve in screw-threaded engagement with said actuating screw and having a less number of threads than said actuating screw, and a load-engaging screw carried by said sleeve and yieldably connected to the actuating screw.

20. In a jack, a casing, an actuating screw, a splined sleeve in screw-threaded engagement with said actuating screw and having a less number of threads than said actuating screw, a detent fastened in said casing and fitting said spline to constrain the rotation of said sleeve and to limit its axial travel relatively to said actuating screw, and a load-engaging screw carried by said sleeve and yieldably connected to said actuating screw.

21. In a jack, a casing, an actuating screw, a sleeve in screw-threaded engagement with said actuating screw and having a spline terminating near the ends of said sleeve, a pin fastened in said casing and fitting said spline to constrain the rotation of said sleeve and to limit its axial travel relatively to said actuating screw, and a load-engaging screw carried by said sleeve, and yieldably connected to said actuating screw.

22. In a jack, an actuating screw, a sleeve in screw-threaded engagement with said actuating screw, a head threaded on said sleeve and a load-engaging screw threaded in said head.

23. In a jack, an actuating screw, a sleeve in screw-threaded engagement with said actuating screw, a head threaded on said sleeve and having an annular recess therein, and a load-engaging screw threaded in said head, said actuating screw extending into said recess in the lowermost position of said sleeve.

In testimony whereof, we affix our signatures.

GEORGE F. KUEHN.
LEON W. ROSENTHAL.